Sept. 8, 1931.  T. R. LANDSBOROUGH  1,822,155
SWING SAW
Filed May 9, 1930
Fig.1.
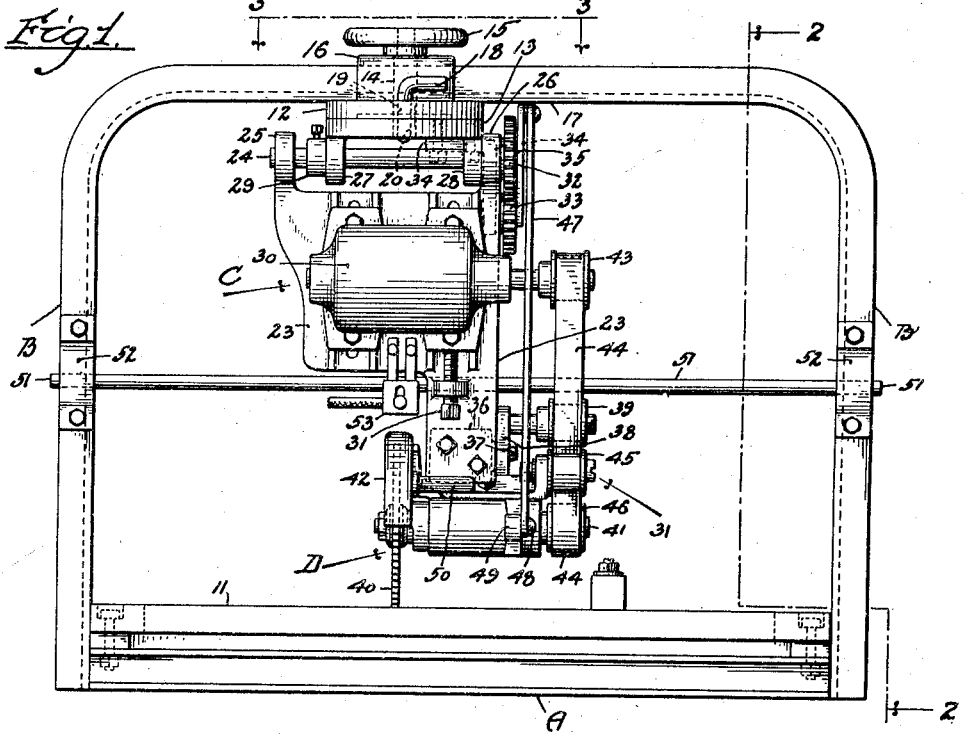
Fig.2.
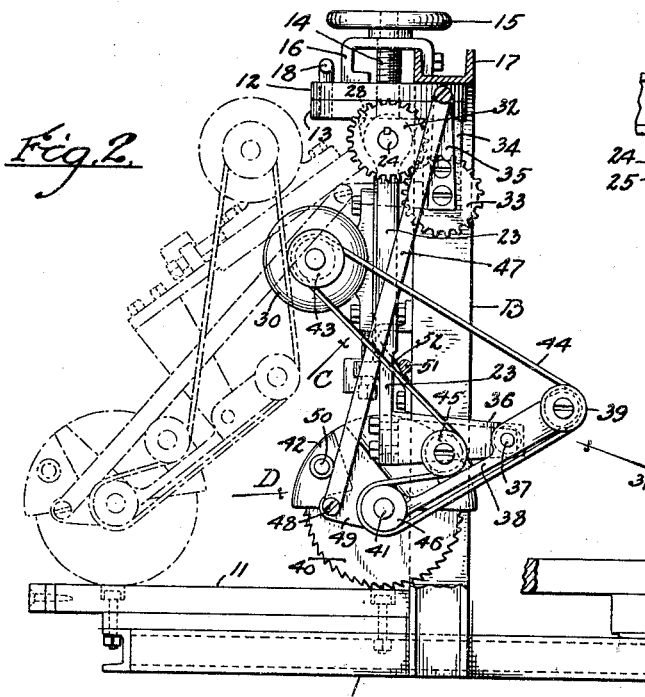
Fig.3.
INVENTOR
Tom R. Landsborough
ATTORNEY Patented Sept. 8, 1931

1,822,155

UNITED STATES PATENT OFFICE

TOM R. LANDSBOROUGH, OF FLORIN, CALIFORNIA

SWING SAW

Application filed May 9, 1930. Serial No. 451,006.

This invention relates to swing saws such as are commonly employed as cut-off saws, miter saws, and the like.

The primary object of this invention is to provide a swing saw of compact and sturdy arrangement that may be transported and set up on various jobs to supply the cutting means required.

In practice, it has been found that swing cut-off saws, which are so constructed as to swing the cutting edge of the saw in a substantially straight line, yield the best service, inasmuch as it does not require a divided table to hold the work. A saw of this nature may also be used to rabbet a piece of lumber or to groove a piece of lumber, as well as to operate as a straight cut-off saw. Accordingly, it becomes an object of this invention to provide a swing saw of the nature described, characterized by having means for swinging the saw in a substantially straight line.

In saws of the above nature, it is likewise desirable that means be incorporated for using the saw to make miter cuts. Consequently, it is another object of this invention to provide a saw of this character with means for turning the saw so that it may be operated as a miter saw.

A saw of the foregoing described characteristic finds general usefulness as a portable saw upon jobs where straight cuts or miter cuts, rabbeting or grooving is required. Other features, such as the compact arrangement, the sturdiness, and the handiness of the saw will be best appreciated from the description taken in conjunction with the drawings, in which—

Fig. 1 is a front elevational view showing my saw complete;

Fig. 2 is a side view taken substantially on the line 2—2 of Fig. 1; and

Fig. 3 is a fragmentary view taken on line 3—3 of Fig. 1.

In the drawings, I have shown my invention as comprising a base frame generally designated A; an upright frame B mounted on the said base frame; a swinging frame C mounted upon the upright frame B; and a saw frame D pivotally mounted upon the swinging frame C.

The foregoing principal component parts of my invention are correlated with attendant mechanism to provide an operable unit for the purpose described. More specifically describing the foregoing units and the operative mechanism associated therewith, it is seen that the base frame A is provided with a platform 11 mounted thereon for holding the work to be sawed. Means is provided for pivotally connecting the swing frame C with the supporting frame B, and preferably consists of a circular plate 12 mounted upon the frame B and arranged to slidably engage a plate 13. The means for holding the plates 12 and 13 in operative relation comprises a screw-threaded shaft 14 mounted in the plate 13 and extending through the plate 12. A hand wheel 15 is mounted on the upper end of the shaft 14 and bears against a supporting member 16 which, in turn, is attached to the channel iron 17, that is a part of the supporting frame B. It is thus clear that the plates 12 and 13 may be clamped together by operating the hand wheel 15.

The means just described will be recognized as providing a movement to a saw which may be utilized to rotate the swinging frame C to turn the saw to cut at any desired angle. However, since the majority of miter cuts are made on definite angles; namely, 90°, 60°, and 45°, I have provided means for definitely setting the saw to cut at these angles. This means comprises a pin and hole arrangement, and, as shown, consists of a pin 18 adapted to fit into holes 19 and 20 in the plates 12 and 13, respectively. This particular arrangement holds the saw in a straight cutting position and cuts at right angles or 90°. In order to turn the saw to a 60° cut, I have provided another hole 21 in the plate 12, which may be brought into registration with the hole 20 by removing the pin 18. The pin is then inserted into the holes 21 and 20, and the saw is set to cut on a 60° angle. A similar arrangement is provided for a 45° cut, and consists of a hole 22 in the plate 13, which may likewise be brought into registration with the hole 20. It is obvious that this arrangement may be duplicated for any number of predetermined cuts. For any intermediate cuts, the plates may be clamped securely together by means of the hand wheel 15 and the screw-threaded shaft 14.

More specifically describing the swinging frame C, it is shown as comprising a suspended plate 23 affixed to a shaft 24 by hub members 25 and 26. The shaft 24 is rotatably supported in ears 27 and 28, which are an integral part of the plate member 13, and depend therefrom. A collar 29 is mounted upon the shaft 24 and serves to prevent lateral movement of the shaft through the ears 27 and 28. A motor 30 is suitably mounted upon the plate 23 in any conventional manner, and is preferably provided with a belt-tightening means, such as shown at 31. Keyed to the shaft 24 is a gear 32 which meshes with a gear 33 that is rotatably mounted upon an arm 34 which, in turn, is mounted upon the plate 13. It is thus obvious that as the plate 23 is swung, the shaft 24 is rotated, and rotates the gear 32, which imparts rotation to the gear 33. The gear 33 is provided with an arm 35 which swings correspondingly with any movement of said gear. The purpose of this arm will be later described.

Mounted on the lower end of the plate 23 is an offset member 36 securely attached thereto. The aforementioned saw frame D is pivotally mounted, as shown at 37, upon the outer end of the arm 36. More specifically describing the saw frame D, it is shown as comprising a frame member 38 carrying at one end a pulley 39, and at the other end a saw 40 suitably journaled therein, as shown at 41. The frame member 38 is adapted to swing upon the pivot point 37. The saw 40 is preferably provided with a conventional guard member 42.

The means of driving the saw from the motor 30 comprises a belt 44, said belt riding over a pulley 43 mounted upon the motor 30, then passing downwardly over a pulley 45 rotatably mounted upon the frame member 38 and outwardly over a pulley 46 which is arranged to drive the saw 40, and back over the pulley 39. This arrangement of a driving means will be recognized as providing a swingable belt driving means that maintains the same tension in the belt in all positions of swinging the frame member 38 upon the pivot point 37. The means of holding the saw frame D in a substantially horizontal position, as the swinging frame C is swung upon the shaft 24, consists of a link 47 pivotally connected to the arm 35 at one end, and at the opposite end pivotally connected, as shown at 48, to a lug 49 extending from the frame member 38. It thus becomes apparent that as the saw is swung outwardly, the gear 32 imparts rotation to the gear 33 which swings the arm 35 and causes the link 47 to rotate the frame member 38 upon the pivot point 37 in a manner to hold the cutting edge of the saw substantially in a horizontal plane as it is advanced or retracted. Means is provided for manually swinging the saw, and consists of a handle member 50 suitably mounted upon the guard 42. In cases where the saw is employed as a rip saw or a rabbeting or a grooving saw, it is preferable to hold the saw fixed and pass the work beneath the cutting edge. For this purpose, I have provided a stop member in the form of a bar 51, suitably mounted upon the frame B, as shown at 52, and adapted to hold the saw against backward movement when work is pushed beneath. In order that the saw may present the utmost utility, I have equipped the swinging frame C with a switch 53 in a readily accessible position for operating the motor 30.

The structure set forth will be recognized as disclosing a swing saw characterized by having means for advancing or retracting the saw in a substantially horizontal line together with means for setting the saw to cut mitre cuts at any desired horizontal angle.

The foregoing description is directed toward a specific embodiment of my invention, and deals with specific parts and the arrangement of the parts therein. I am aware that certain modifications and alterations may be resorted to in the process of manufacture which would in no wise alter the principle of my invention. It is, therefore, my intention to include all such alterations and substitution of equivalents which do not depart from the scope of the specification and the purview of the claims.

I claim as my invention:

1. A swinging saw organization comprising: a supporting frame; a swinging frame mounted upon said supporting frame; means for rotatably supporting said swinging frame upon said supporting frame; a saw frame pivotally mounted upon said swinging frame; a saw operably mounted in said saw frame; means for causing the cutting edge of said saw to move in a substantially straight line upon swinging the said swinging frame, said means including a gear mounted on said swinging frame; a second gear mounted upon said supporting frame and adapted to mesh with said first mentioned gear; and a link pivotally and eccentrically connected at one end with said last mentioned gear and at the opposite end pivotally connected to said saw frame.

2. A swinging saw organization comprising: a supporting frame; a swinging frame mounted upon said supported frame; a saw frame pivotally mounted upon said swinging frame; a saw operably mounted in said saw frame; means for causing the cutting edge of said saw to move in a substantially straight line upon swinging said swinging frame, said means including a pair of gears adapted to be rotated by said swinging frame, one of said gears being mounted on the swinging frame and the other upon the supporting frame, and a link connected to the last mentioned gear and said saw frame to pivot said saw frame on said swinging frame as said gears are rotated by said swinging frame.

3. A swinging saw organization comprising: a supporting frame; a swinging frame mounted upon said supporting frame; means for rotatably supporting said swinging frame upon said supporting frame; a saw frame pivotally mounted upon said swinging frame; a saw operably mounted in said saw frame; means for causing the cutting edge of said saw to move in a substantially straight line upon swinging the said swinging frame, said means including a pair of gears adapted to be rotated by said swinging frame, one of said gears being mounted upon the swinging frame and the other of said gears being mounted upon the supporting frame, and a link connected to the last mentioned gear and said saw frame to pivot said saw frame on said swinging frame as said gear is rotated by said swinging frame.

4. A swinging saw organization comprising: a supporting frame; a plate mounted upon said supporting frame; a second plate slidably engaging said first mentioned plate; means for angularly adjusting said second plate relative to said first mentioned plate; a swinging frame suspended from said second plate; a saw frame pivotally mounted upon said swinging frame; a gear adapted to be rotated by said swinging frame; a second gear pivotally mounted upon said second plate and meshing with said first mentioned gear; and a link eccentrically and pivotally connected at one end to said second gear, said link being pivotally connected at the opposite end to said saw frame to pivot said saw frame upon said swinging frame as said swinging frame is swung.

In testimony whereof, I have hereunto set my hand at Florin, California, this 1st day of May, 1930.

TOM R. LANDSBOROUGH.